United States Patent
Turkowski

(10) Patent No.: US 12,541,865 B2
(45) Date of Patent: Feb. 3, 2026

(54) IMAGE PROCESSING WITH IMAGE REGISTRATION TO FACILITATE COMBINATION OF IMAGES MODIFIED BY NEURAL NETWORKS WITH REFERENCE IMAGES

(71) Applicant: NVIDIA Corporation, Santa Clara, CA (US)

(72) Inventor: Kenneth Turkowski, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 456 days.

(21) Appl. No.: 18/150,889

(22) Filed: Jan. 6, 2023

(65) Prior Publication Data
US 2024/0233146 A1    Jul. 11, 2024

(51) Int. Cl.
*G06T 7/33*      (2017.01)
*G06T 3/02*      (2024.01)
*G06T 3/18*      (2024.01)
*G06T 3/40*      (2024.01)
*G06V 10/44*     (2022.01)
*G06V 10/82*     (2022.01)

(52) U.S. Cl.
CPC ............... *G06T 7/337* (2017.01); *G06T 3/02* (2024.01); *G06T 3/18* (2024.01); *G06T 3/40* (2013.01); *G06V 10/44* (2022.01); *G06V 10/82* (2022.01)

(58) Field of Classification Search
CPC ......... G06T 7/30–38; G06T 3/02; G06T 3/18; G06T 3/40; G06T 7/337; G06V 10/44; G06V 10/82
See application file for complete search history.

(56) References Cited

U.S. PATENT DOCUMENTS

| | | | |
|---|---|---|---|
| 7,577,313 B1 * | 8/2009 | Georgiev | ............... G06T 11/001 |
| | | | 382/284 |
| 11,398,255 B1 | 7/2022 | Mann et al. | |
| 2018/0181809 A1 | 6/2018 | Ranjan et al. | |
| 2018/0336464 A1 | 11/2018 | Karras et al. | |
| 2020/0151559 A1 | 5/2020 | Karras et al. | |
| 2021/0049468 A1 | 2/2021 | Karras et al. | |
| 2021/0097691 A1 | 4/2021 | Liu | |

* cited by examiner

*Primary Examiner* — Casey L Kretzer
(74) *Attorney, Agent, or Firm* — Foley & Lardner LLP

(57) ABSTRACT

In various examples, systems and methods are disclosed relating to registering image processing with image registration for image generation and content stream applications. Systems and methods are disclosed for registering portions of images that are modified to incorporate content or features, with references images from which the portions of the images are identified. The systems and methods can transform the modified portions to more realistically and precisely merge back into the reference images, such as for presentation as a content stream.

20 Claims, 6 Drawing Sheets

IMAGE PROCESSING WITH IMAGE REGISTRATION TO FACILITATE COMBINATION OF IMAGES MODIFIED BY NEURAL NETWORKS WITH REFERENCE IMAGES

BACKGROUND

Machine learning models can be used to modify properties of images to achieve characteristics for how the images are presented. However, modifying the images can result in undesired characteristics for how the images are presented. For example, warping, scaling, shading, or animating a portion of the images can make it difficult to combine the modified portions with remainders of the original image.

SUMMARY

Embodiments of the present disclosure relate to image registration for image generation systems and content streaming applications. Systems and methods are disclosed for extending the precision and domain of image generation and/or content streaming systems, by using image registration in artificial intelligence (AI) systems (that may include neural networks) to facilitate the more realistic combination of images modified by the neural networks with original reference images.

In contrast to conventional systems, such as those described above, systems and methods in accordance with the present disclosure can allow image modifications, including model-driven image modifications, to be applied to portions of images (e.g., one or more subimages) while more effectively combining (e.g., merging, blending, etc.) the modified subimage with the original reference image. For example, registration can be determined between the modified subimage and the reference image, and can be used to transform the modified subimage prior to combining the modified subimage with the reference image. This can allow disparities between the modified subimage and the reference image to be reduced or prevented, such as where the modified subimage of the image is warped or shaded. This can allow images to be modified using various inputs—such as (for example and without limitation) audio data indicating speech to be outputted by subjects in the images (which may also indicate movement to be performed by the subjects to coincide with the speech) and/or video data indicating movements to apply to subjects in the images—in real-time and while preserving a realistic appearance and/or perception of the images. As such, the precision and potential domain of image processing and registration can be extended.

At least one aspect of the present disclosure relates to a processor. The processor can include one or more circuits to identify a subimage from a reference image, the subimage including a subset of pixels of the reference image. The one or more circuits can be used to modify the subimage to obtain a modified subimage. The one or more circuits can be used to perform registration of a portion of the modified subimage, with a corresponding portion of the reference image, to meet at least one criteri(a/on) for alignment between the portion and the corresponding portion, to determine a transformation for the modified subimage according to the registration. The one or more circuits can be used to transform the modified subimage, using the transformation, to obtain a transformed subimage. The one or more circuits can be used to modify the reference image using the transformed subimage.

The one or more circuits can be used to identify the portion of the modified subimage according to at least one of (i) a criteri(a/on) for detection of one or more features in the portion or (ii) a criteri(a/on) for expected movement of pixels representing the one or more features in the portion. The one or more circuits can be used to perform the registration by determining at least one transform, which may include one or more transforms including but not limited to a similarity transform, a translation transform, an affine transform, a rigid transform, or a projective transform.

The one or more circuits can be used to identify one or more features of interest of the reference image to identify the subimage. The one or more circuits can be used to provide (i) the subimage and (ii) a driving signal to one or more neural network models to cause the one or more neural network models to modify the subimage to obtain the modified subimage, the modified subimage being at least one of warped, scaled, animated, or shaded relative to the subimage. The one or more circuits can be used to identify the one or more features of interest by identifying at least one physical feature of a subject in the reference image.

The one or more circuits can be used to perform the registration using at least one of brightness data or contrast data of the portion. The one or more circuits can be used to perform the registration according to a gradient profile of the modified subimage. The one or more circuits can be used to perform the registration using at least one of (i) a dense registration process according to a first subset of features of the portion of the modified subimage or (ii) a sparse registration process according to a second subset of features of the portion of the modified subimage. The one or more circuits can be used to modify the reference image using the transformed subimage by at least one of (i) blending the reference image with the transformed subimage or (ii) stitching the reference image with the transformed subimage.

At least one aspect of the present disclosure relates to a system. The system can include one or more processing units to execute operations including identifying a subimage from a reference image, the subimage comprising a subset of pixels of the reference image. The one or more processing units can be used to modify the subimage to obtain a modified subimage. The one or more processing units can be used to perform registration of a portion of the modified subimage, with a corresponding portion of the reference image, to meet criteri(a/on) for alignment between the portion and the corresponding portion, to determine a transformation for the modified subimage according to the registration. The one or more processing units can be used to transform the modified subimage, using the transformation, to obtain a transformed subimage. The one or more circuits can be used to modify the reference image using the transformed subimage.

The one or more processing units can be used to identify the portion of the modified subimage according to at least one of (i) criteri(a/on) for detection of one or more features in the portion or (ii) criteri(a/on) for expected movement of pixels representing the one or more features in the portion. The one or more processing units can be used to perform the registration by determining at least one transform, which may include one or more transforms including but not limited to a similarity transform, a translation transform, an affine transform, a rigid transform, or a projective transform.

The one or more processing units can be used to identify at least one feature of interest of the reference image to identify the subimage. The one or more processing units can be used to provide (i) the subimage and (ii) a driving signal to one or more neural network models to cause the one or more neural network models to modify the subimage to obtain the modified subimage, the modified subimage being at least one of warped, scaled, animated, or shaded relative to the subimage. The one or more processing units can be used to identify the at least one feature of interest by identifying at least one physical feature of a subject in the reference image.

The one or more processing units can be used to perform the registration using at least one of brightness data or contrast data of the portion. The one or more processing units can be used to perform the registration according to a gradient profile of the modified subimage. The one or more processing units can be used to perform the registration using at least one of (i) a dense registration process according to a first subset of features of the portion of the modified subimage or (ii) a sparse registration process according to a second subset of features of the portion of the modified subimage. The one or more processing units can be used to modify the reference image using the transformed subimage by at least one of (i) blending the reference image with the transformed subimage or (ii) stitching the reference image with the transformed subimage.

At least one aspect of the present disclosure relates to a method. The method can include identifying a subimage from a reference image, the subimage comprising a subset of pixels of the reference image. The method can include modifying the subimage to obtain a modified subimage. The method can include performing the registration of a portion of the modified subimage, with a corresponding portion of the reference image to meet criteri(a/on) for alignment between the portion and the corresponding portion, to determine a transformation for the modified subimage according to the registration. The method can include transforming the modified subimage using the transformation, to obtain a transformed subimage. The method can include modifying the reference image using the transformed subimage.

The method can include identifying the portion of the modified subimage according to at least one of (i) criteri(a/on) for detection of one or more features in the portion or (ii) criteri(a/on) for expected movement of pixels representing the one or more features in the portion. The method can include performing the registration by determining at least one transform, which may include one or more transforms including but not limited to a similarity transform, a translation transform, an affine transform, a rigid transform, or a projective transform.

The method can include identifying one or more features of interest of the reference image to identify the subimage. The method can include providing (i) the subimage and (ii) a driving signal to one or more neural network models to cause the one or more neural network models to modify the subimage to obtain the modified subimage, the modified subimage being at least one of warped, scaled, animated, or shaded relative to the subimage. The method can include identifying the one or more features of interest by identifying at least one physical feature of a subject in the reference image.

The method can include performing the registration using at least one of brightness data or contrast data of the portion. The method can include performing the registration according to a gradient profile of the modified subimage. The method can include performing the registration using at least one of (i) a dense registration process according to a first subset of features of the portion of the modified subimage or (ii) a sparse registration process according to a second subset of features of the portion of the modified subimage. The method can include modifying the reference image using the transformed subimage by at least one of (i) blending the reference image with the transformed subimage or (ii) stitching the reference image with the transformed subimage.

The processors, systems, and/or methods described herein can be implemented by or included in at least one of a system associated with an autonomous or semi-autonomous machine (e.g., an in-vehicle infotainment system); a system for performing simulation operations; a system for performing digital twin operations; a system for performing light transport simulation; a system for performing collaborative content creation for 3D assets; a system for performing deep learning operations; a system implemented using an edge device; a system implemented using a robot; a system for generating or presenting virtual reality (VR) content, augmented reality (AR) content, and/or mixed reality (MR) content; a system for performing conversational AI operations; a system for generating synthetic data; a system incorporating one or more virtual machines (VMs); a system implemented at least partially in a data center; or a system implemented at least partially using cloud computing resources.

BRIEF DESCRIPTION OF THE DRAWINGS

The present systems and methods for image processing using neural networks, with image registration, are described in detail below with reference to the attached drawing figures, wherein.

DETAILED DESCRIPTION

Figure 1:
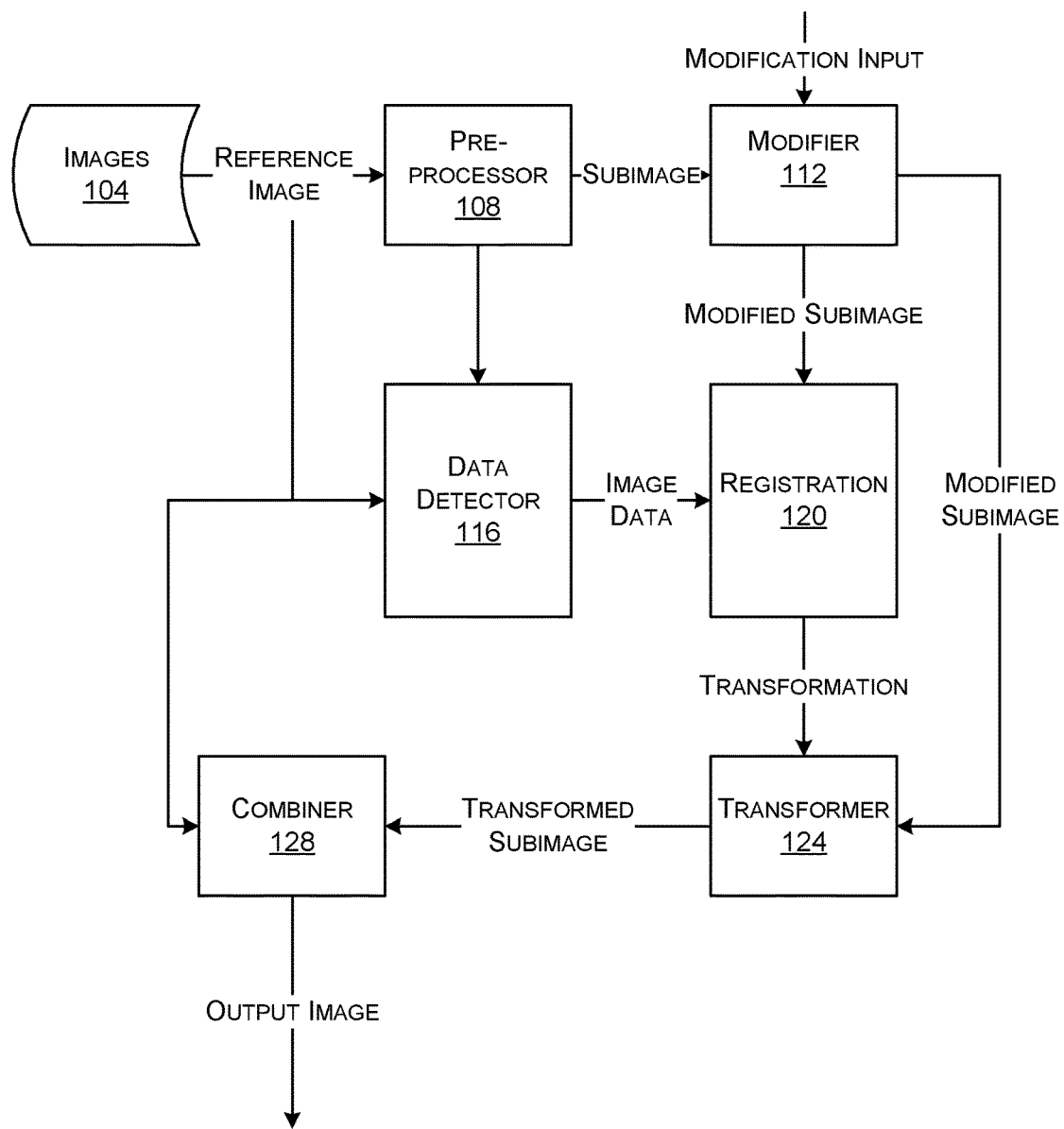
FIG. 1 is a block diagram of an example computing environment for image processing models with registration.

Systems and methods are disclosed related to efficiently registering a subimage of an image (e.g., inset image) with a reference image from which the subimage is identified (e.g., extracted for processing/modification), so that after the subimage is modified, the modified subimage image can be combined with the reference image in a more realistic or seamless manner. In one or more embodiments, dense image registration can be used to align a portion of the subimage with the reference image, and a transformation can be applied to the subimage according to the registration before the subimage is combined (e.g., blended or stitched) with the reference image.

The modification to the subimage can result in the subimage not lining up with the reference image. For example, operations can be applied to the subimage that cause translation, scaling, warping, shading, rotation, or other changes to the subimage or pixels or groups of pixels thereof. This can include, for example, operations performed such as modifying the subimage using one or more neural network models that receive the subimage and a driving signal as inputs to generate or output the (modified) subimage. The driving signal can be, for example, a video signal and/or an audio signal (e.g., audio monologue) having features to incorporate into the subimage. For example, the reference image can be a still image, such as a picture of a person including the head and upper chest/shoulders of the person, and the driving signal can be a video signal of a different person used to animate facial movement and expressions of the person of the still image.

The subimage can be selected based on a particular content of interest. For example, where the content of interest corresponds to face/head features, various facial recognition or facial feature recognition algorithms can be used to select the portion of the reference image to be used for the subimage. The portion of the reference image selected for the subimage can be scaled to match with one or more input criteri(a/on) (e.g., a pixel space) of the one or more machine learning models; generally, smaller subimages can be more useful since they may involve less downscaling to meet the one or more input criteri(a/on) of the one or more machine learning models.

To combine the subimage with the reference image, a registration can be determined between the subimage and the reference image. The registration can be determined as a matrix or other data structure that has instructions for modifications (e.g., further modifications) to at least a portion of the subimage. The portion of the subimage can be selected based on various predetermined factors, such as portions expected to have clearly defined features and/or features expected to be relatively static (e.g., over multiple frames in a video context) relative to a remainder of the subimage. Combining the subimage with the reference image can include blending the subimage with the reference image (e.g., blending the modified subimage with the reference image, such as blending or stitching the modified subimage with a portion of the reference image that was not selected for the subimage), with or without transparency; the blending can be formed in various manners, including a feathered blend or multi-resolution blend. For example and without limitation, in one or more embodiments the subimage can be blended with the reference image according to a blending seam curve, such as by using a distance transform or a graph cut.

The portion of the subimage used for registration can, for example, include a bounded region of a defined shape, for instance. The bounded region can be specified, for example, with a polygon, such as a polygon of pixels of a lower edge of the subimage. This can be useful for processing images that include head/face/upper body features (e.g., animated features that may change from frame to frame), such as to form the polygon around a lower band of the subimage corresponding with the shoulder/upper chest; the polygon can thus be transformed to facilitate transitioning between the relatively static features of the reference image in the lower chest area with the more dynamic features in the remainder of the subimage adjacent to the polygon.

The transform (or transformation) can be determined based on one or more criteri(a/on) for matching at least the portion of the subimage with the reference image. Practical, robust and non-limiting examples of the transform can include a translation, similarity, affine, rigid, or projective transform. For example, the transform can be a transform having a predetermined number of degrees of freedom, such as between about 2 and 8 degrees of freedom, such as 2, 3, 4, 6, or 8 degrees of freedom. The type of transform can be selected based on an expected characteristic of the images on which the transform is to be performed; for example, a similarity transform can be useful for operations performed on subimages that include head/facial features in video data content, as such subimages may be warped in a manner that can be effectively addressed using these transforms. As such, the system can determine a transform that relates two images over a small or defined region, and propagates over (e.g., applies to) the transform to the whole subimage image, which may be a warped subregion of the reference image; thus registered and transformed, the subimage and the original reference image can be blended together by the system.

The transform (e.g., a similarity transform) can be accurately and efficiently determined using various functions, such as a least squares approach or metric, which may include terms for regularization or constraints. Various image data parameters, such as brightness, contrast, and/or gradients, can be used to further improve the accuracy of the transform. The transform can be determined based on the pixels of the portion of the subimage (e.g., to perform dense registration), or using point correspondences (e.g., to perform sparse registration), or various combinations thereof.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 is an example computing environment including an image processing system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The image processing system 100 can be used to implement one or more aspects of the process 200 described with reference to FIG. 2.

The image processing system 100 can operate on one or more images 104 (e.g., reference images, source images). The images 104 can be retrieved from an image stream (e.g., sequence of image frames) or database maintained by or remote from the image processing system 100. The images 104 can correspond to at least one of images of a subject, such as a person or object, captured by an image capture device (e.g., camera), or images generated computationally (which may be representative of a subject, including by being modifications of images from an image capture device). The images 104 can each include a plurality of pixels, such as pixels arranged in rows and columns. The images 104 can include image data assigned to one or more pixels of the images 104, such as color, brightness, contrast, intensity, depth (e.g., for three-dimensional (3D) images), or various combinations thereof.

The image processing system 100 can include at least one pre-processor 108. The pre-processor 108 can (be used to) perform operations to prepare the image 104 for further processing by the image processing system 100, including filtering, scaling, offset, compression, decompression, and/or cropping operations.

For example, the pre-processor 108 can at least one of crop or scale the image 104. The pre-processor 108 can scale (e.g., downscale or upscale) and/or crop the image to meet one or more size criteri(a/on) for processing such as image modification by modifier 112. For example, the image 104 can have a first size (e.g., resolution, such as 1920 pixels by 1080 pixels), while modifier 112 or other components of image processing system 100 can be configured to process images having a second size (e.g., 500 pixels by 500 pixels). The pre-processor 108 can perform various compression, decompression, filtering, sampling, or interpolation operations to crop and/or scale the image 104. The pre-processor 108 can crop and/or scale portions of the image 104, such as subimages as described further herein.

The pre-processor 108 can identify a subimage from the image 104. The subimage can include at least one subset of pixels of the image 104. For example, the subimage can include a polygonal (e.g., square or rectangular) subset of pixels of the image 104. The pre-processor 108 can identify the subimage according to predetermined size or shape of the subset of pixels, such as a predetermined count of pixels and/or aspect ratio of the subset of pixels.

The pre-processor 108 can identify the subimage by selecting the subset of pixels of the image 104 according to at least one feature of interest represented by the subset of pixels, such as particular features represented by the subset of pixels. For example, the feature of interest can correspond to a subject or a portion of the subject that the image processing system 100 is configured to process. The feature of interest can correspond to a particular object or category of object, or a physical feature of the subject such as a head or face of the subject. For example, the pre-processor 108 can apply any of various feature detection, shape detection, edge detection, and/or facial detection operations on the image 104 to identify pixels representing the content of interest for the subimage.

The pre-processor 108 can scale (and/or crop) the subimage to correspond to the one or more size criteri(a/on), such as a second size of input criteri(a/on) of the modifier 112. For example, the modifier 112 can have an input criteri(a/on)criterion to receive image data having a resolution of 500 by 500 pixels (or various other resolutions), and the pre-processor 108 can scale the subimage to have the resolution of 500 by 500 pixels. The pre-processor 108 can identify the subset of pixels to have at least a threshold portion of pixels corresponding to the content of interest, so that any reduction in image fidelity resulting from (up) scaling of the subimage to meet the input criteri(a/on) of the modifier 112 can be reduced or avoided.

Referring further to FIG. 1, the image processing system 100 can include or be coupled with a modifier 112. The modifier 112 can be or include any function, model (e.g., machine learning model), operation, routine, logic, or instructions to perform functions such as modifying the subimage or portions thereof, or the image 104 or portions thereof. The modifier 112 can be implemented by the image processing system 100, or the image processing system 100 communicate with a remote system implementing the modifier 112, such as to provide the subimage to the modifier 112 and receive a modified subimage in response from the modifier 112 (e.g., by accessing an application programming interface (API) of the modifier 112).

The modifier 112 can receive a modification input (e.g., driving input) and can modify the subimage according to the modification input. The modifier 112 can output a modified subimage responsive to receiving the subimage and the modification input. The modifier 112 can receive the modification input synchronously or asynchronously with respect to receiving the subimage; for example, the modifier 112 can receive the subimage as one or more subimage frames at a first rate, and receive the modification input as one or more inputs at a second rate, which may be the same as or different than the first rate (including either or both of the subimage and the modification input being a single data element or a stream or sequence of data elements).

The modification input can include any of a variety of data structures or types of data indicating information to use for modifying the subimage. For example, the modification input can include an image or image stream, such as video data arranged as a plurality of image frames. The modification input can indicate an operation to apply to the subimage, such as a vector or matrix representing operations such as warping, shading, scaling, animation, or coloring (e.g., applying particular colors to the subimage, or retrieving intensity data from the subimage to generate a grayscale representation of the subimage). The modification input can include text, speech, and/or audio data. For example, the modifier 112 can receive the modification input as text to be spoken by a subject of (e.g., depicted at least partially in) the subimage, and can modify features of the subject such as mouth space, facial expressions, head orientation, and gestures according to realistically present the subject as speaking the text. The modifier 112 can determine a modification to apply to the subimage according to the modification input. As a result of the modification applied by the modifier 112 according to the modification input, the modified subimage may have differences relative to the subimage including but not limited to differences in size, shape, coloring, or relative positioning of pixels or features represented by subimage as compared with the modified subimage.

For example, the modifier 112 can include one or more models (e.g., machine learning models) that are configured (e.g., trained) to modify the subimage according to the modification input. The model can include one or more neural networks. The neural network can include an input layer, an output layer, and one or more intermediate layers, such as hidden layers, which can each have respective nodes. The image processing system 100 can train, modify, or update the neural network by modifying parameters, such as weights and/or biases, of various nodes of the neural network responsive to evaluating estimated (e.g., candidate) outputs of the neural network. The image processing system 100 can receive the model in a trained or pre-trained format (e.g., receiving a data structure representing the model or parameters of the model, such as weights and biases that can be used to configure the model). The image processing system 100 can update or modify the model using training data, feedback from users, or various combinations thereof.

For example, the model can be a model (e.g., neural network or machine learning model) to apply at least one of an image modification or an audio modification to the subimage according to the modification input, where the modification input is a video stream having image data and audio data. The model can be trained or updated (e.g., by the image processing system 100 and/or a training system separate from the image processing system 100) using training data having training data elements (e.g., instances) that include images (or video data) to be modified, video streams to modify the images, and example modified images (or video data). As described further herein with reference to FIG. 2, this can allow the model to generate modified subimages that can have characteristics such as facial features and head positions that are modified to match those of the modification input, including to modify languages of speech from a subject of the modified subimages.

The image processing system 100 can include a data detector 116. The data detector 116 can be or include any function, model (e.g., machine learning model), operation, routine, logic, or instructions to perform functions such as detecting, identifying, or determining parameters or features of the images 104 and/or subimages, including parameters that can be used to facilitate modification and transformation of subimages. For example, the data detector 116 can identify or determine parameters including but not limited to any of brightness, contrast, gradients (e.g., gradient profiles), grayscale information, or various combinations thereof. The data detector 116 can output image data indicating the identified parameters for use by various other components of the image processing system 100.

For example, the data detector 116 can identify at least one of brightness data or contrast data of one or more pixels of the subimage. The data detector 116 can identify the at least one of the brightness data or the contrast data by parsing the subimage, which may have brightness and/or contrast data assigned to one or more respective pixels.

The data detector 116 can determine a grayscale subimage from the subimage, and can determine a grayscale modified subimage from the modified subimage. For example, the data detector 116 can determine an intensity value of one or more pixels of the subimage (as well as the modified subimage), and can map the intensity value to a grayscale scale (e.g., a scale where 0=black, N=white, and values from 1 . . . N−1 are increments of gray according to the respective intensity values). The data detector 116 can identify the intensity value from the subimage and/or determine the intensity value according to parameters of the pixels of the subimage, such as color values (e.g., one or more RGB values).

The data detector 116 can determine at least one gradient of various images and subimages, including the subimage, the modified subimage, the grayscale subimage, and/or the grayscale modified subimage. For example, for one or more pixels of the grayscale subimage or the grayscale modified subimage, the data detector 116 can determine at least one of a horizontal gradient or a vertical gradient. The data detector 116 can determine a gradient profile indicating at least one of a horizontal gradient or a vertical gradient for each of a plurality of pixels of the subimage (or the modified subimage, or various other images and subimages described herein). The gradients can represent changes in parameters (e.g., intensity or grayscale values, among others) at particular pixels of the subimage (the data detector 116 detecting the intensity values from the subimage in order to determine gradients). The data detector 116 can determine horizontal gradients and vertical gradients for each pixel of the subimage. The data detector 116 can determine the gradients (e.g., horizontal and/or vertical) using any of a variety of gradient determination operations, such as finite difference operations, kernels, convolution filters, or various combinations thereof.

The image processing system 100 can include a registration component 120. The registration component 120 can include any function, model (e.g., machine learning model), operation, routine, logic, or instructions to perform functions such as registering images, such as registering the modified subimage determined by the modifier 112 or a portion of the modified subimage with the image 104 or a corresponding portion of the image 104. For example, the registration component 120 can determine a transformation indicating an operation or instructions to transform the modified subimage to register the modified subimage with the image 104. The registration component 120 can evaluate the portion of the modified subimage to determine the transformation, and apply the transformation to a greater portion of the modified subimage, such as an entirety of the modified subimage.

The registration component 120 can perform the registration of the portion of the modified subimage with the corresponding portion of the reference image to meet criteri(a/on) for alignment between the portion of the modified subimage and the corresponding portion of the reference image, in order to determine or select a particular transformation to the modified subimage for modifying the reference image using a transformed subimage (e.g., the modified subimage having the particular transformation applied to the modified subimage). For example, the registration component 120 can evaluate one or more criteri(a/ion) indicative of alignment between the modified subimage and the corresponding portion of the reference image, such as metrics indicative of errors or differences between pixels or features of the respective modified subimage and corresponding portion of the reference image, and can determine, update, re-select, or modify estimated or candidate transformations according to the evaluation. For example, the registration component 120 can determine the particular transformation by determining parameters of the particular transformation that at least one of minimize the metric, reduce the metric to have a value less than a threshold value, or reduce the metric to zero.

The registration component 120 can perform the registration as at least one of dense registration or sparse registration to transform various modified subimages. For example, the registration component 120 can perform dense registration according to a first subset of pixels or features of the modified subimage, and can perform sparse registration using a second subset of pixels or features of the modified subimage. The features can be geometric coordinates representing shapes, edges, curves, or other aspects of the content represented by the pixels. The first subset can have a greater number of pixels (or features) than the second subset. In some implementations, the first subset can have all pixels of the portion of the modified subimage. The registration component 120 can perform the sparse registration using point correspondences or feature correspondences, such as by applying an optical flow operation to the image 104 and modified subimage to identify the second subset of pixels as pixels (or features) satisfying a correspondence criteri(a/on) between the image 104 and the modified subimage. The registration component 120 can perform each of dense registration and sparse registration on one or more modified subimages; for example, the registration component 120 can perform sparse registration on the second subset of features to determine a second transformation, and at least one of (i) perform dense registration on the first subset of pixels to determine a first registration according to the second transformation or (ii) determine a third transformation according to the first transformation and the second transformation (e.g., determine an average or other composite of the first transformation from dense registration and the second transformation from sparse registration). The registration component 120 can use at least one of the first transformation from dense registration of a first modified subimage or the second transformation from sparse registration of the first modified subimage to perform registration (dense or sparse) of a second modified subimage, such as where the first and second subimages are subimages of a sequence of images frames (e.g., of a video sequence).

The registration component 120 can perform the registration using various transforms (e.g., transformations) having various parameters corresponding to various degrees of freedom. For example, the registration component 120 can use a similarity transform having four degrees of freedom (horizontal displacement (x), vertical displacement (y), scale (k), and rotation (θ)). The registration component 120 can use a translation transform having two degrees of freedom (horizontal displacement (x) and vertical displacement (y)). The registration component 120 can use an affine transform having six degrees of freedom (translation (x, y), rotation (θ), scale (k), aspect ratio, shear). The registration component 120 can use a rigid transform having three degrees of freedom (translation (x, y), rotation (θ)). The registration component 120 can use a projective transformation having eight degrees of freedom (corresponding to eight ratios of modifications that can be applied to the data to be transformed). The registration component 120 can implement the transformations as matrices (e.g., 3×3 matrices) to apply to a vector or matrix representation of image data. The registration component 120 can evaluate the metric according to the parameters to determine values of the parameters that satisfy the one or more criteri(a/on) for alignment of the modified subimage with the corresponding portion of the reference image (e.g., corresponding portion of image 104).

The registration component 120 can perform the registration between image data $I_0(x, y)$ (e.g., the image 104) and $I_1(x, y)$ (e.g., the modified subimage) to determine a transformation to apply to $I_1(x, y)$ to register $I_1(x, y)$ with $I_0(x, y)$. $I_1(x, y)$ can represent an overlap region corresponding to a portion of the modified subimage, such as a polygon having pixels representing a portion that the registration component 120 selects to facilitate registration (such that the image processing system 100 can apply the transformation to a greater portion of the modified subimage, such as the entire modified subimage).

The registration component 120 can evaluate the registration using various criteri(a/on). For example, the registration component 120 can evaluate the registration using a metric (e.g., difference metric or error metric), such as a least squares metric, with respect to the transformed subimage (e.g., candidate or estimate transformed subimage) and the image 104:

$$E = \frac{1}{2|\Omega|} \sum_{(x,y)\in\Omega} (I_1(u(x, y; p), v(x, y; p)) - I_0(x, y))^2$$

where $\Omega$ is the overlap region, $|\Omega|$ is the cardinality or number of pixels in the overlap region, p is a vector of parameters for the transformation (e.g., $(t_x, t_y, k, \theta)$), and u( ) and v( ) are the transformations from x and y, respectively, given a set of parameters p. For example, $I_1(u(x,y;p),v(x,y;p))$ can represent a candidate or estimated transformation of the subimage given the set of parameters p, and Equation 1 can represent a least squares evaluation of the error of the candidate transformed subimage relative to the image 104. As shown in Equation 1, the registration component 120 can normalize the least squares metric by the overlap cardinality $|\Omega|$ to avoid the registration component 120 minimizing the least squares metric by reducing the size of the overlap area to zero.

The registration component 120 can select a particular set of parameters p according to the evaluation of the metric, such as by identifying the particular set of parameters p that minimizes the metric or reduces the metric to be below a target threshold. For example, the registration component 120 can determine the particular set as p*:

$$p^* = \mathrm{argmin}_p(E)$$

p* can correspond to the registration component 120 determining a parametric Jacobian of the metric to be zero. For example, a difference between $I_1(u(x,y;p),v(x,y;p))$ and $I_0(x, y)$ can be defined as $e(x, y, p) = I_1(u(x,y;p), v(x,y;p)) - I_0(x, y)$, such that:

$$E = \frac{1}{2|\Omega|} \sum_{(x,y)\in\Omega} e(x, y; p)^2$$

$$\frac{\partial E}{\partial p} = \frac{1}{2|\Omega|} \sum_{(x,y)\in\Omega} 2e(x, y; p) \frac{\partial e(x, y; p)}{\partial p}$$

which reduces to:

$$\frac{\partial E}{\partial p} = \frac{1}{|\Omega|} \sum_{(x,y)\in\Omega} e(x, y; p) \frac{\partial e(x, y; p)}{\partial p}$$

As such, the registration component 120 can define the parametric Jacobian as:

$$\frac{\partial e(x, y; p)}{\partial p} = \frac{\partial}{\partial p} I_1(u(x, y; p), v(x, y; p)) = \frac{\partial I_1}{\partial u} \frac{\partial u}{\partial p} + \frac{\partial I_1}{\partial v} \frac{\partial v}{\partial p}$$

where $$\frac{\partial I_1(u, v)}{\partial u} \text{ and } \frac{\partial I_1(u, v)}{\partial v}$$

are the horizontal gradient and vertical gradient of the image (e.g., candidate transformed subimage portion $I_1$). The registration component 120 can receive gradients from the data detector 116 (e.g., gradients determined from grayscaling of images and/or subimage as applicable).

The registration component 120 can evaluate the parametric Jacobian according to the particular transformation being used. For example, the registration component 120 can use the similarity transform:

$$u(x, y; t_x, t_y, k, \theta) = k(x\cos\theta - y\sin\theta) + t_x$$
$$v(x, y; t_x, t_y, k, \theta) = k(x\sin\theta + y\cos\theta) + t_y$$

of which the respective derivatives are (e.g., in a matrix format A=Jacobian matrix):

$$\frac{\partial u}{\partial t_x} = 1 \quad \frac{\partial u}{\partial t_y} = 0 \quad \frac{\partial u}{\partial k} = x\cos\theta - y\sin\theta \quad \frac{\partial u}{\partial \theta} = k(-x\sin\theta - y\cos\theta)$$

$$\frac{\partial v}{\partial t_x} = 0 \quad \frac{\partial v}{\partial t_y} = 1 \quad \frac{\partial v}{\partial k} = x\sin\theta + y\cos\theta \quad \frac{\partial v}{\partial \theta} = k(+x\cos\theta - y\sin\theta)$$

An enumerator can be defined to associate an index (e.g., i) with each respective pixel in $\Omega$:

$$\Omega = \bigcup_{i=1}^{|\Omega|}(x_i, y_i)$$

such that $A_i$ can be the Jacobian matrix for the ith pixel, $b_i$=the gradient at pixel i:

$$b_i = \begin{bmatrix} \frac{\partial I_1(u,v)}{\partial u} & \frac{\partial I_1(u,v)}{\partial v} \end{bmatrix}$$

$c_i = b_i A_i e_i$, and $J_i = b_i A_i$.

$J_i$ can represent a (1×2)×(2×4) matrix multiplication, such that the Jacobian $J_i$ is a 1×4 matrix, and $e_i$ is a scalar. As such, the registration component 120 can define:

$$\frac{\partial E}{\partial p} = \frac{1}{|\Omega|}\sum_{i=1}^{|\Omega|} J_i e_i$$

where combining all $J_i$ into J and all $e_i$ into e results in:

$$\frac{\partial E}{\partial p} = J^T \frac{e}{|\Omega|}$$

The registration component 120 can determine the registration (e.g., the transformation to use for the registration) according to an optimization or minimization of $$\frac{\partial E}{\partial p},$$

such as by at least one of reducing $$\frac{\partial E}{\partial p}$$

to be less than a target threshold or determining values of the parameters p such that $$\frac{\partial E}{\partial p}$$

equals zero. The registration component 120 can apply various functions to identify the values of the parameters p for which $$\frac{\partial E}{\partial p}$$

is at least one of less than the target threshold or equal to zero. For example, the registration component 120 can apply various algorithms used for solving optimizations, such as for solving least square metric optimizations.

For example, the registration component 120 can apply a Levenberg-Marquardt algorithm to determine p*. The registration component 120 can apply the Levenberg-Marquardt algorithm by iteratively determining the step $\delta$ in:

$$[J^T J + \lambda \text{diag}(J^T J)]\delta = J^T e$$

The registration component 120 may not store the entire J and e matrices; instead, $J^T J$ and $J^T e$ can be determined on a pixel-by-pixel basis, yielding 4×4 and 4×1 matrices, respectively, where $J^T J$ can represent a sum of outer products and $J^T e$ a weighted sum of vectors. For example, at each pixel:

$$H = J^T J = \sum_{i=1}^{|\Omega|} J_i^T J_i$$

$$G = J^T e = \frac{1}{|\Omega|}\sum_{i=1}^{|\Omega|} J_i^T e_i$$

$$E = \frac{1}{2|\Omega|}\sum_{i=1}^{|\Omega|} e_i^2$$

The registration component 120 can use a decomposition or factorization operation, such as Cholesky decomposition, to determine $\delta$. This can be useful since the $J^T J$ matrix may be positive semi-definite, and the augmented $J^T J + \lambda \text{ diag}(J^T J)$ can be made positive definite with a large enough $\lambda$.

In some implementations, the registration component 120 (or the pre-processor 108, among other components of the image processing system 100) can apply a normalization to the subimage to facilitate registration. For example, in some situations, the error landscape that the registration component 120 evaluates to determine the parameters p* may have greater range relative to some parameters as compared with others; as an example, rather than being round, the error landscape can be long, such as where rotation is constrained to [−π, +π], and the scale k is about 1, but the translation may be of the order of 1000. The registration component 120 can normalize the modified subimage by dividing the pixel coordinate values of the pixels of the subimage by a normalization factor (e.g., a normalization factor on a same order as a size metric of the modified subimage, such as 256, 512, or 1000 where the subimage has a size on the order of 512×512 pixels).

The registration component 120 can determine the transformation by using information from previously determined transformations to determine the transformation for registration of a current modified subimage with a current image 104, such as where the images 104 correspond to a video sequence. For example, responsive to determining a first transformation for a first modified subimage k, the registration component 120 can determine a second transformation for a second modified subimage k+1 using one or more values associated with the first transformation as initial value(s) (e.g., initial values for p*). This can allow the registration component 120 to more efficiently converge to a solution for the transformation. In some implementations, such as where there may be large changes in the features represented by the images 104 (or the modification input), the registration component 120 can initially determine a first transformation for registering modified subimages and/or images 104 according to a relatively low resolution, and use value(s) of the first transformation as initial value(s) for determining a second transformation for registering modified subimages and/or images 104 according to a relatively high resolution. For example, in some instances (such as where large changes or motions are expected or detected by the registration component 120), the registration component 120 can determine transformations according to evaluation of a plurality of resolution levels. This can include, for example, using a pyramid registration process in which the registration component 120 identifies distinct groupings of pixels or features for each level of a plurality of levels, the groupings decreasing in number of pixels (and thus increasing in resolution) from a first level to a last level of the plurality of levels; the numbers of pixels may be related in a predetermined manner, such as a power of two manner. As an example, the registration component 120 can perform a multi- (e.g., eight) level transformation determination in which in a first (e.g., coarsest level) a single pixel movement corresponds a 256 (2 to the 8$^{th}$ power) pixel movement at the eight (e.g., finest) level. By implementing multi-level and/or multi-resolution transformation determination, the registration component 120 can facilitate robust optimization that may follow large features first while avoiding local minima and/or noise.

The registration component 120 can use at least one of brightness data or contrast data (e.g., from the images 104 or modified subimages and/or as identified by the data detector 116) to determine the transformation. This may be useful where the images 104 and modified subimages may not have the same or substantially same exposure. For example, the registration component 120 can determine the transformation using an objective function that includes the at least one of the brightness data or the contrast data, such as to compare the candidate transformation with the image 104 according to the at least one of the brightness data or the contrast data:

$$E = \frac{1}{2|\Omega|} \sum_{(x,y) \in \Omega} (b + cI_1(u(x, y; p), v(x, y; p)) - I_0(x, y))^2$$

The registration component 120 can normalize the pixel values, such that the contrast parameter c has a maximum value of 1.

Referring further to FIG. 1, the registration component 120 can determine the transformation according to one or more point correspondences between the image 104 and the modified subimage (or the portion of the modified subimage). The point correspondences can be vectors or other data structures mapping one or more particular pixels in a first image (e.g., the modified subimage) with one or more corresponding pixels in a second image (e.g., image 104), such as where the particular pixels and corresponding pixels have similar or identical characteristics or parameters For example, the image processing system 100 can include or be coupled with an optical flow component, and can provide the image 104 and the modified subimage as input to the optical flow component to receive point correspondences as output from the optical flow component.

The registration component 120 can determine the transformation according to one or more feature correspondences between the image 104 and the modified subimage (or the portion of the modified subimage). The feature correspondences can be vectors or other data structures mapping one or more particular features (e.g., group(s) of pixel(s) or other geometric coordinates of the first image) with one or more corresponding features in the second image, such as where the particular features and corresponding pixels have similar or identical characteristics or parameters, such as to satisfy feature mapping criteri(a/on) of the optical flow component. Using point correspondences or feature correspondence may allow the registration component 120 to reduce computational requirements for determining the transformation, such as by reducing a number of data points to operate on in order to determine the transformation.

For example, the registration component 120 can receive or identify correspondences $\{(u_i, v_i), (x_i, y_i), i \in \{1, \ldots, N\}\}$, such as where $(u_i, v_i)$ represent pixels or features of a candidate transformed modified subimage, and $(x_i, y_i)$ represent corresponding pixels or features of the image 104. The registration component 120 can determine a transformation for registration between $(u_i, v_i)$ and $(x_i, y_i)$ according to one or more criteri(a/on), a metric based at least on $(u_i, v_i)$ and $(x_i, y_i)$, which can be used to account for more than two point correspondences (e.g., to account for noise or factors associated with the modification of the subimage that may result in non-uniform modification of certain pixels or features relative to other pixels or features). For example, the registration component 120 can determine a similarity transform having parameters $(t_x, t_y, k, \theta)$, and evaluate the metric to reduce or minimize error for:

$$u(x, y; t_x, t_y, k, \theta) = k(x\cos\theta - y\sin\theta) + t_x$$

$$v(x, y; t_x, t_y, k, \theta) = k(x\sin\theta + y\cos\theta) + t_y$$

The registration component 120 can determine means of the sample points to facilitate performing computations in a local coordinate space, which can reduce complexity and/or computational requirements:

$$\bar{u} = \frac{1}{N} \sum_{i=1}^{N} u_i$$

$$\bar{v} = \frac{1}{N}\sum_{i=1}^{N} v_i$$

$$\bar{x} = \frac{1}{N}\sum_{i=1}^{N} x_i$$

$$\bar{y} = \frac{1}{N}\sum_{i=1}^{N} y_i$$

The registration component 120 can determine one or more dot products and/or one or more cross products according to the determined means:

$$A = \sum_{i=1}^{N}(u_i - \bar{u})^2 + (v_i - \bar{v})^2$$

$$B = \sum_{i=1}^{N}(x_i - \bar{x})^2 + (y_i - \bar{y})^2$$

$$C = \sum_{i=1}^{N}(u_i - \bar{u})(y_i - \bar{y}) - (v_i - \bar{v})(x_i - \bar{x})$$

$$D = \sum_{i=1}^{N}(u_i - \bar{u})(x_i - \bar{x}) + (v_i - \bar{v})(y_i - \bar{y})$$

The registration component 120 can determine a scale according to a ratio of magnitudes (e.g., ratio of weighted average magnitudes):

$$k^* = \sqrt{\frac{A}{B}}$$

The registration component 120 can determine rotation angle θ (e.g., determine tangent of θ according to a weighted average according to cross and/or dot products):

$$\theta^* = \text{atan2}(C, D)$$

The registration component 120 can determine translations according to a residual:

$$t_x^* = \bar{x} - k^*(\bar{u}\cos\theta^* - \bar{v}\sin\theta^*)$$

$$t_y^* = \bar{y} - k^*(\bar{u}\sin\theta^* - \bar{v}\cos\theta^*)$$

As such, the registration component 120 can evaluate estimated transformations according to criteri(a/on) analogous to a least squares metric, which can be extended beyond two point correspondences. In some implementations, the registration component 120 can determine one or more dot products or cross products (or combinations thereof) using normalized vectors, or may retain non-normalized data to assign greater weight to longer vectors, which can mitigate noise effects. In some implementations, the registration component can determine the scale k* according to a weighted ratio:

$$k^* = \frac{\sum_{i=1}^{N}\sqrt{(u_i - \bar{u})^2 + (v_i - \bar{v})^2}\sqrt{(x_i - \bar{x})^2 + (y_i - \bar{y})^2}}{\sum_{i=1}^{N}(u_i - \bar{u})^2 + (v_i - \bar{v})^2}$$

The registration component 120 can apply various filtering operations to reduce or avoid the use of outlier data in determining the transformation. For example, the registration component 120 can apply an outlier filter, such as RANSAC, to remove outliers from the point correspondences prior to determining the transformation and/or evaluating the metric to determine the transformation. For example, the registration component 120 can perform an iterative process until a convergence criteria is satisfied of: (1) selecting (e.g., randomly selecting) two distinct point correspondences; (2) determining a transform (e.g., similarity transform) according to the selected point correspondences; (3) evaluating a residual of remaining point correspondences to classify the remaining point correspondences into a first subset of inliers and a second subset of outliers, storing the transform (e.g., to maintain a list of transform(s) according to a number of inliers to identify the transform corresponding to a greatest number or at least a threshold number of inliers) and storing the first subset of inliers; (4) repeating steps (1) through (3) until the convergence criteria is satisfied (e.g., the convergence criteria can include, without limitation, a maximum number of iterations or a maximum threshold change in results of steps (1) through (3)); and (5) applying a metric, such as least squares, to the identified first subset of inliers.

Referring further to FIG. 1, the registration component 120 can identify or select a portion of the subimage (or the modified subimage) to use for determining the transformation. The portion of the subimage can be a subset of pixels (or features) of the subimage. The registration component 120 can identify the portion of the subimage according to at least one of (i) criteri(a/on) for detection of a feature in the portion or (ii) criteri(a/on) for expected movement of pixels representing the feature in the portion. For example, the criteri(a/on) for detection of the feature in the portion can be based on one or more of (a) an edge location of the subimage (e.g., selecting the portion to include pixels of a lower edge or lower band of the subimage, such as a two-dimensional subset of pixels including pixels of the lower edge or within a threshold number of pixels from the lower edge), (b) a class of information represented by the subimage (e.g., body and/or head of a subject, among other examples), or (c) ease (e.g., accuracy, precision, and/or computational requirements) for detecting the feature. The criteri(a/on) for movement can correspond to features expected to be relatively static across a sequence of subimages relative to features in other portions of the subimages. For example, edges of a subject's shirt, shoulders, and/or chest may be relatively easy to detect (e.g., distinguish from background), and the shirt, shoulders, and/or chest may move relatively little (or not at all, e.g., remain in the same position) over multiple frames as compared with the subject's head/face.

The registration component 120 can apply a detection operation according to the criteri(a/on), the detection operation including any of various feature, edge, shape, object, face, or head recognition or detection operations, or various combinations thereof, to the subimage to identify the portion. For example, responsive to applying the detection operation, the registration component 120 can identify the portion of the subimage to be a portion representing a shoulder/upper chest region of a subject, where a remainder of the modified subimage may represent the subject's head/face.

The registration component 120 can identify the portion as a polygon of pixels. For example, the registration component 120 can determine the identified portion to have pixels bounded by a plurality of edges (e.g., at least three edges, which may include an edge at or adjacent to (e.g., within a threshold number of pixels from) a lower edge of the subimage).

Referring further to FIG. 1, the image processing system 100 can include a transformer 124. The transformer 124 can include any function, model (e.g., machine learning model), operation, routine, logic, or instructions to perform functions such as applying the transformation to the modified subimage to determine a transformed subimage. For example, the transformer 124 can receive the transformation (e.g., a vector, matrix, or other data structure representing the transformation, such as the data structure $p^*=(t_x, t_y, k, \theta)$, and apply the transformation to the modified subimage. For example, the transformer 124 can apply the transformation to each pixel of the modified subimage to determine the transformed subimage.

The image processing system 100 can include a combiner 128. The combiner 128 can include any function, model (e.g., machine learning model), operation, routine, logic, or instructions to perform functions such as combining, stitching, or blending image data of the reference image and image data the transformed subimage to determine an output image, such as by modifying the reference image (e.g., modifying a portion of the reference image) using the transformed subimage. The combiner 128 can perform feathered blending, multi-resolution blending, blending with or without transparency, or various combinations thereof.

For example, the combiner 128 can identify a remainder of the image 104 (e.g., at least some of a portion of the image 104 that was not selected as the subset of pixels of the subimage) and form the output image using the remainder and the transformed subimage. The combiner 128 can use position information of the remainder and the transformed subimage to determine the output image, such as to align the remainder and the transformed subimage in a same relative orientation as the remainder and the subimage in the image 104. Due to various operations described herein, such as the transformation of the modified subimage according to the registration, the output image (e.g., combination of the remainder of the image 104 and the transformed subimage) can have a more seamless, realistic presentation while incorporating dynamic changes from the modification input.

Figure 2:
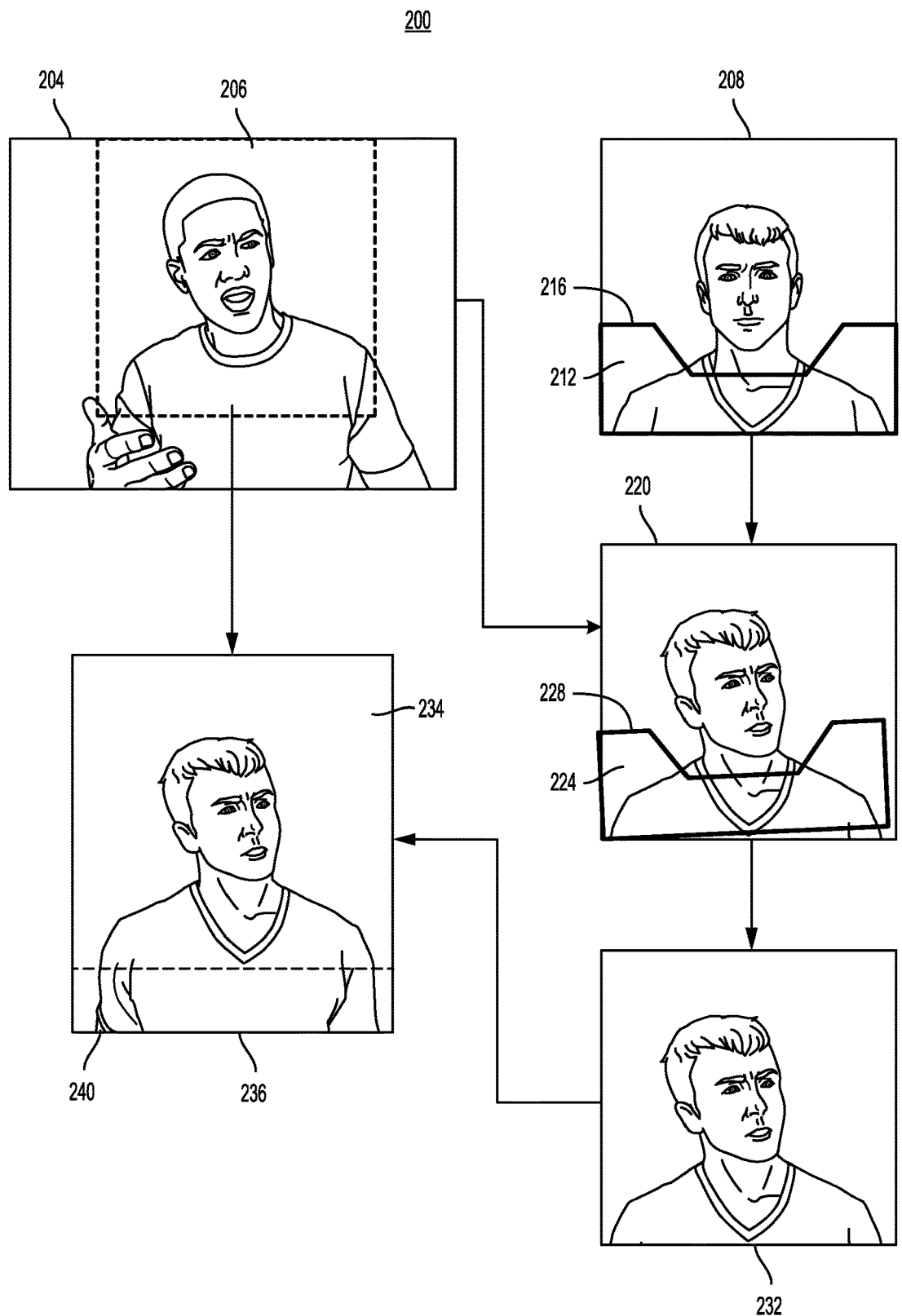
FIG. 2 is a schematic diagram of examples of images and subimages processed by registration and transformation in accordance with some embodiments of the present disclosure.

Now referring to FIG. 2, FIG. 2 depicts an example of a process 200 for processing images that may be implemented by various systems and devices described herein, such as the image processing system 100. For example, the process 200 can be implemented by the image processing system 100 to generate more realistic image and audio outputs for an image having at least a portion modified using a modification input.

The process 200 can include retrieving at least one image 204 of a modification input. In the example depicted in FIG. 2, the image 204 represents a head, shoulders, and chest of a subject, in which the subject's head is tilted to the left and the subject's eyes are looking to the right. The at least one image 204 may be of a video stream, such a stream of the subject speaking, along with associated head, body, and hand movements as the subject is speaking, and may have audio data mapped to the at least one image 204. In some implementations, a portion 206 of the at least one image 204 is used as the modification input, such as a portion having at least one of a size corresponding to an input criteri(a/on) of a modifier (e.g., modifier 112) or representing particular content of interest (e.g., facial expressions).

The process 200 can include retrieving at least one subimage 208. The subimage 208 can be selected from a reference image, such as to select a portion of the reference image having a head, shoulders, and upper chest of the subject. In the example depicted in FIG. 2, the subject of the subimage 208 is looking approximately straight ahead with little or no head tilt.

The process 200 can include identifying a portion 212 of the subimage 208. The portion 212 can be portion including pixels of a lower edge of the subimage 208. The portion 212 can represent features of the subimage 208 that may be expected to be relatively easy to detect and/or static (either in a sequence of subimages 208 or with respect to corresponding features of the image 204 that are to be used to modify the subimage 208). For example, in the example depicted in FIG. 2, the portion 212 is a polygon with three edges along the bottom edge of the subimage 208 and lower left and lower right edges of the subimage 208, along with an upper boundary 216 that is spaced around the head of the subject (which may be modified in a relatively dynamic manner as compared with the shoulder/upper chest features represented by the portion 212 due to the images 204 of the modification input).

The process 200 can include determining or receiving a modified subimage 220 based at least on the modification input represented by the portion 206 of the image 204 and the subimage 208. For example, the subimage 208 and the portion 206 can be provided as input to a modifier (e.g., modifier 112) that modifies the subimage 208 using the portion 206. In the example depicted in FIG. 2, the subject of the subimage 208 has been modified to include features of the subject of the portion 206, including head tilt and eye direction, as well as shoulder tilt. As such, the modified subimage 220 has a portion 224 having an upper boundary 228 corresponding to the portion 212 having the upper boundary 216, and which has been changed in shape and orientation relative to the portion 212.

The process 200 can include determining a transformation to apply to the modified subimage 220 to register the modified subimage 220 with the reference image from which the subimage 208 is retrieved. For example, a similarity transformation or other transformation can be determined using the portion 224 and a corresponding portion of the reference image, such as a portion of the reference image adjacent to where the subimage 208 is identified, that meets a criteri(a/on) for realistic alignment of the portion 224 with the reference image. The transformation can be applied to the modified subimage 220 (e.g., the entirety of the modified subimage 220) to determine a transformed subimage 232. For example, the transformed subimage 232 can represent features that more smoothly transition from the transformed subimage 232 to the reference image as compared with the modified subimage 220.

The process 200 can include determining an image 236 using the transformed subimage 232 and the reference image. For example, the image 236 can be determined or generated by combining, blending, or otherwise modifying the reference image using the image 236. In the example depicted in FIG. 2, the image 236 includes a portion 234 corresponding to the transformed subimage 232, and a portion 240 corresponding to a remainder of the reference image (e.g., middle/lower chest and sides of arms) that was not included in the subimage 208. As depicted in FIG. 2, the portion 240 smoothly transitions into the portion 234; for example, the arms, shoulders, and chest of the subject have smooth rather than disjoint transitions that might otherwise occur due to the modification to the subimage 208 as represented by the modified subimage 220.

Figure 3:
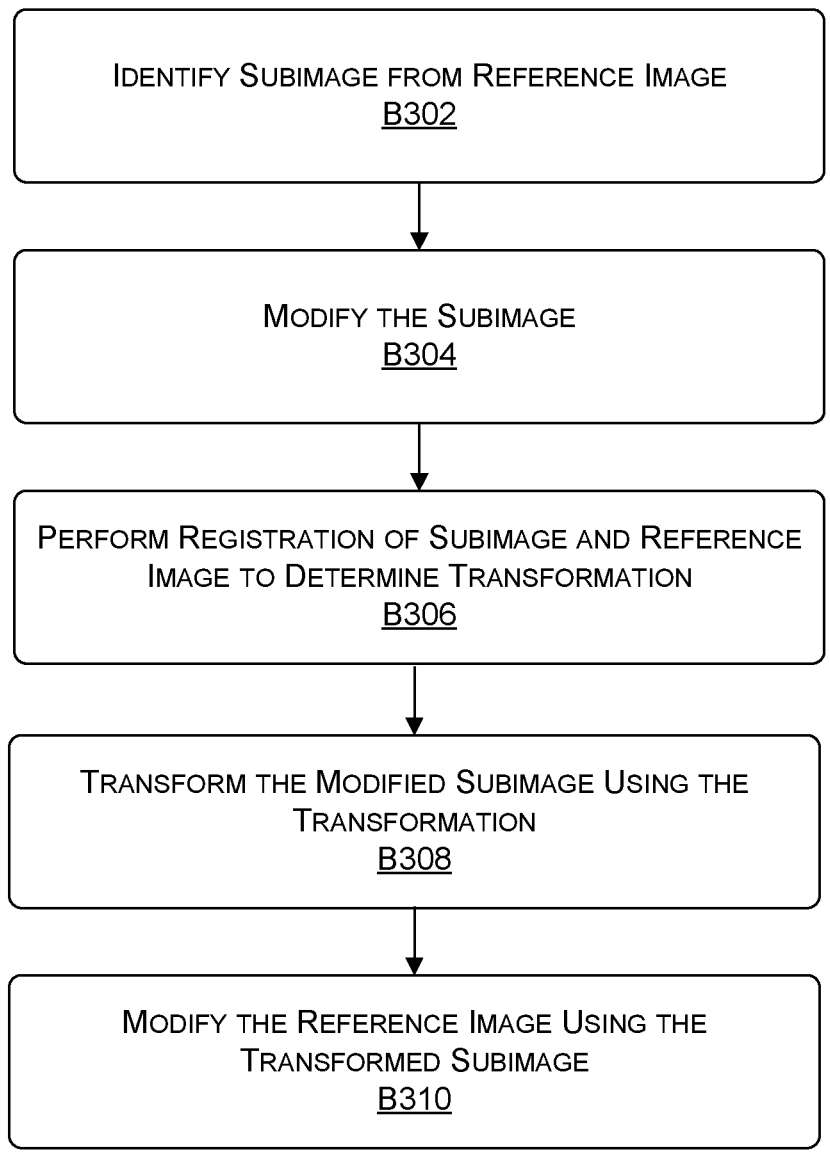
FIG. 3 is a flow diagram of an example of a method of image processing with registration.

Now referring to FIG. 3, each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the system of FIG. 1 and the process of FIG. 2. However, this method may additionally or alternatively be executed by any one system, or any combination of systems, including, but not limited to, those described herein.

FIG. 3 is a flow diagram showing a method 300 for image registration for processing of images using models, such as neural networks, in accordance with some embodiments of the present disclosure. The method 300, at block B302, includes identifying a subimage from a reference image. The subimage can be identified as a subset of pixels of the reference image. For example, the subimage can be identified to include pixels representing a feature of interest, such as a feature of interest (e.g., to be modified) for a particular application of the reference image. The feature of interest can be identified using various feature detection operations, including but not limited to edge, shape, object, or facial recognition algorithms. The subimage can be identified responsive to receiving the reference image, responsive to receiving instructions to generate a modified subimage from the reference image, or periodically (e.g., according to a schedule, or for each reference image of a sequence of reference images, such as where the reference images are of a video stream). The subimage (or the reference image) can be resized (e.g., scaled) to meet criteri(a/on) for further processing.

The method 300, at block B304, includes modifying the subimage to obtain a modified subimage. The subimage can be modified according to a driving signal indicating a modification input. The driving signal can be received and/or used to modify the subimage (or a sequence of subimages from a sequence of reference images) synchronously (e.g., at the same rate) or asynchronously (e.g., at different rates) relative to identification of the subimage. For example, the driving signal can include at least one of image data (e.g., a plurality of images representing video content), text data, or audio data, such that the driving signal can indicate visual features to apply to the subimage so that the subimage represents the visual features (e.g., facial expressions, mouth shapes). The subimage can be a still image, and the driving signal can be periodically received to periodically modify the subimage to generate a content stream of modified subimages. The subimage can be modified using one or more neural networks trained to modify the subimage.

The method 300, at block B306, includes performing registration of a portion of the modified subimage. The registration can be performed to meet criteri(a/on) for aligning the modified subimage with image data corresponding to the reference image, such as a portion of the reference image adjacent to where the subimage is identified from the reference image. For example, the registration can be performed using criteri(a/on) such as metrics, such as difference or error metrics (e.g., a least squares metric). The criteri(a/on) can be configured to determine transformations (to apply to the modified subimage) that smoothly transition features of the modified subimage into features of the reference image. The registration can be performed responsive to determining each modified subimage. The registration can be performed using information such as brightness and/or contrast of the modified subimage. The registration can be performed using gradients (e.g., horizontal and/or vertical gradients) of the modified subimage.

The registration can be performed to determine any of a variety of transformations, such as transformations having between two and eight degrees of freedom, such as translation, similarity, affine, rigid, or projective transforms. The registration can be performed using various amounts of pixels or features of the modified subimage, such as to perform dense or sparse registration. For example, dense registration can be performed according to a first subset of pixels or features of the modified subimage, and sparse registration can be performed using a second subset of pixels or features (or point correspondences) of the modified subimage.

The registration can be performed on a portion of the modified subimage, such as a polygon subset of pixels of the modified subimage. For example, the portion of the modified subimage can be identified according to at least one of (i) a criteri(a/on) for detection of a feature in the portion or (ii) a criteri(a/on) for expected movement of pixels representing the feature in the portion. The criteri(a/on) for detection of the feature can be indicative of features that may be relatively easily detected given a type of information represented by the subimage, such as shoulders that may be easily detected (e.g., by edge detection) relative to a background of the subimage. The criteri(a/on) for expected movement can be based on the features represented and information represented by the driving signal; for example, shoulders and chest features of a subject may be expected to move less than the head or face of the subject.

The registration can be performed iteratively, such as for multiple modification inputs of the driving signal (e.g., inputs received sequentially, or in a batch, such as text to be processed for speech by the subject of the subimage). A registration determined for a first subimage can be used to estimate a registration for a second subimage. For example, registration data, such as a transformation, determined for the first subimage can be used for initial value(s) (e.g., for optimization of the metric(s) of the at least one at least one criterion) for determining the registration for the second subimage. In some implementations, one or both of sparse registration and dense registration can be performed for one or more first subimages, and the transformation determined using the sparse registration can be used to determine the dense registration for one or more second subimages (which may include any of the one or more first subimages).

The method 300, at block B308, includes transforming the modified subimage using the transformation, to obtain a transformed subimage. Transforming the modified subimage can include applying parameters from a data structure (e.g., vector, matrix) to the modified subimage, such as to the pixels of the modified subimage. Transforming the modified subimage can cause features represented by the modified subimage to more closely align with features of the reference image (e.g., of a remainder of the reference image that was not selected for the subimage).

The method 300, at block B310, includes modifying the reference image using the transformed subimage. For example, image data of the reference image, such as at least some pixels or features of the reference image that were not selected for the subimage, can be combined with the transformed subimage through processes such as blending or stitching. The modifying can include feathered blending, multi-resolution blending, or blending using transparency.

Example Content Streaming System

Figure 4:
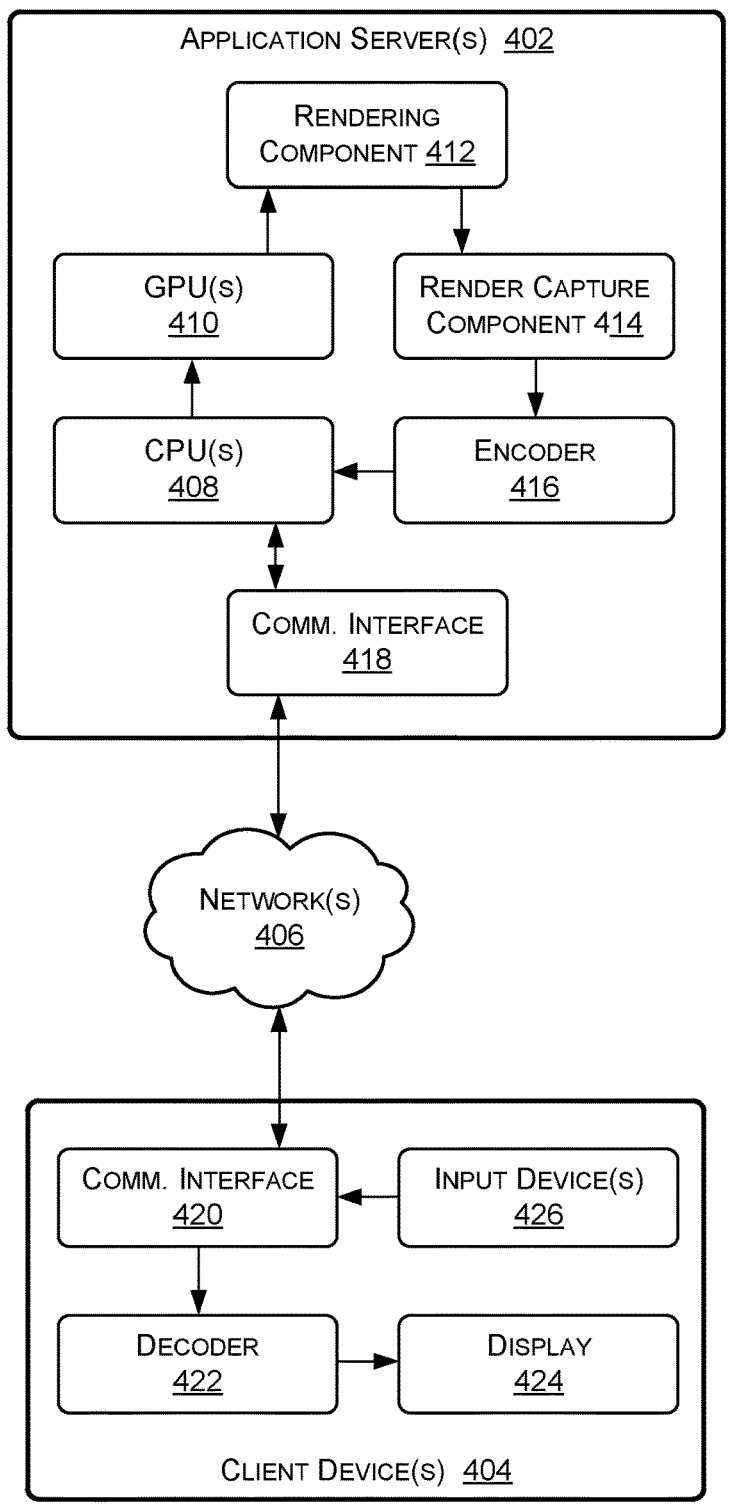
FIG. 4 is a block diagram of an example content streaming system suitable for use in implementing some embodiments of the present disclosure.

Now referring to FIG. 4, FIG. 4 is an example system diagram for a content streaming system 400, in accordance with some embodiments of the present disclosure. FIG. 4 includes application server(s) 402 (which may include similar components, features, and/or functionality to the example computing device 500 of FIG. 5), client device(s) 404 (which may include similar components, features, and/or functionality to the example computing device 500 of FIG. 5), and network(s) 406 (which may be similar to the network(s) described herein). In some embodiments of the present disclosure, the system 400 may be implemented to perform image processing and registration operations. The application session may correspond to a game streaming application (e.g., NVIDIA Geforce Now), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types. For example, the content stream system 400 can be implemented to modify subimages extracted from reference images, register the modified subimages with at least a portion of the reference images, transform the modified subimages according to a transformation determined by the registration, and generate a stream of content by combining the transformed subimages with the reference images.

In the system 400, for an application session, the client device(s) 404 may only receive input data in response to inputs to the input device(s), transmit the input data to the application server(s) 402, receive encoded display data from the application server(s) 402, and display the display data on the display 424. As such, the more computationally intense computing and processing is offloaded to the application server(s) 402 (e.g., rendering—in particular ray or path tracing—for graphical output of the application session is executed by the GPU(s) of the game server(s) 402). In other words, the application session is streamed to the client device(s) 404 from the application server(s) 402, thereby reducing the requirements of the client device(s) 404 for graphics processing and rendering.

For example, with respect to an instantiation of an application session, a client device 404 may be displaying a frame of the application session on the display 424 based on receiving the display data from the application server(s) 402. The client device 404 may receive an input to one of the input device(s) and generate input data in response, such as to provide modification inputs of a driving signal for use by modifier 112. The client device 404 may transmit the input data to the application server(s) 402 via the communication interface 420 and over the network(s) 406 (e.g., the Internet), and the application server(s) 402 may receive the input data via the communication interface 418. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 412 may render the application session (e.g., representative of the result of the input data) and the render capture component 414 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 402. In some embodiments, one or more virtual machines (VMs)—e.g., including one or more virtual components, such as vGPUs, vCPUs, etc.—may be used by the application server(s) 402 to support the application sessions. The encoder 416 may then encode the display data to generate encoded display data and the encoded display data may be transmitted to the client device 404 over the network(s) 406 via the communication interface 418. The client device 404 may receive the encoded display data via the communication interface 420 and the decoder 422 may decode the encoded display data to generate the display data. The client device 404 may then display the display data via the display 424.

Example Computing Device

Figure 5:
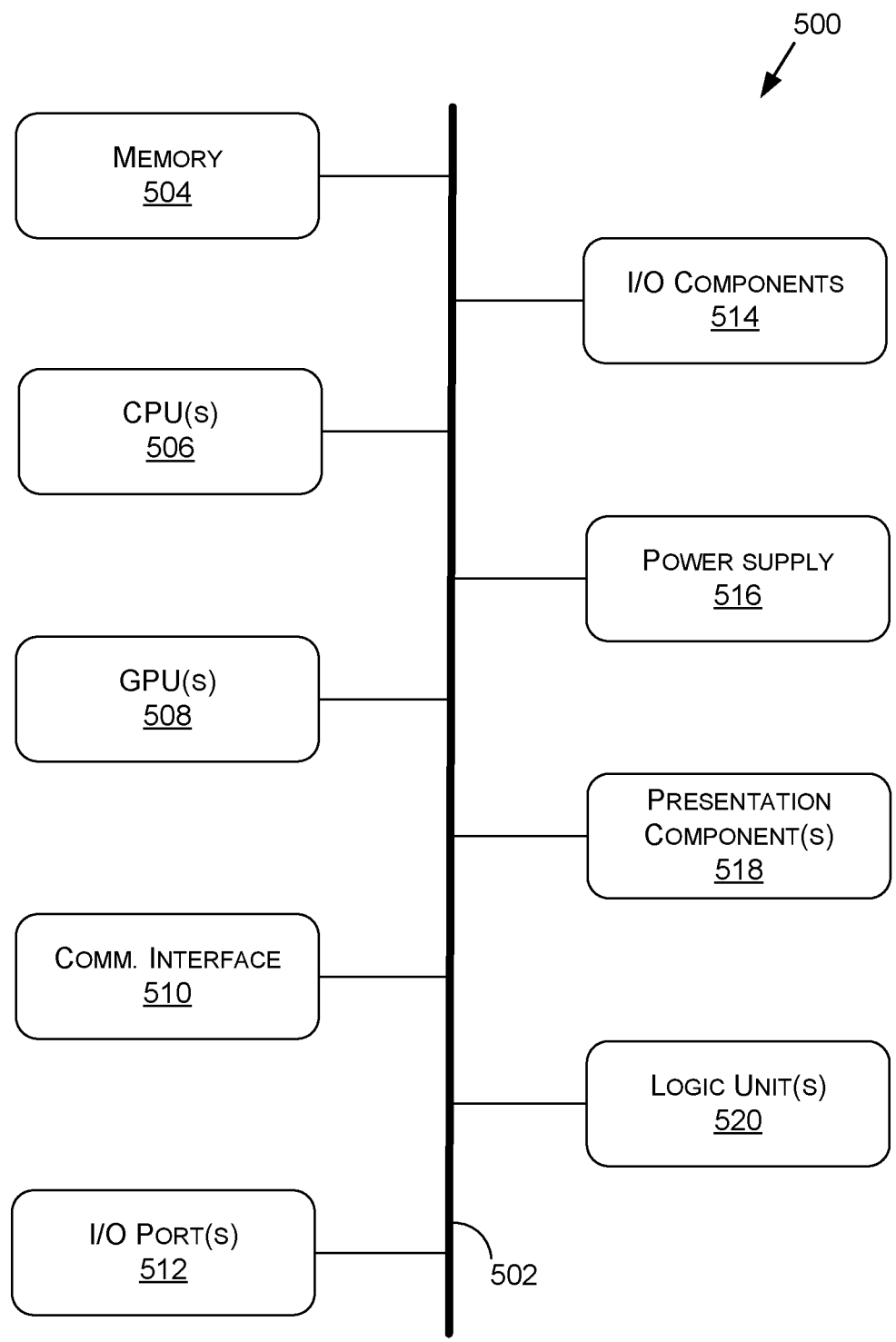
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may be arranged in various topologies, including but not limited to bus, star, ring, mesh, tree, or hybrid topologies. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Image Processing Units (IPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that allow the computing device 500 to communicate with other computing devices via an electronic communication network, included wired and/or wireless communications. The communication interface 510 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508. In some embodiments, a plurality of computing devices 500 or components thereof, which may be similar or different to one another in various respects, can be communicatively coupled to transmit and receive data for performing various operations described herein, such as to facilitate latency reduction.

The I/O ports 512 may allow the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user, such as to generate a driving signal for use by modifier 112, or a reference image (e.g., images 104). In some instances, inputs may be transmitted to an appropriate network element for further processing, such as to modify and register images. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that allow detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to allow the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.).

Example Data Center

Figure 6:
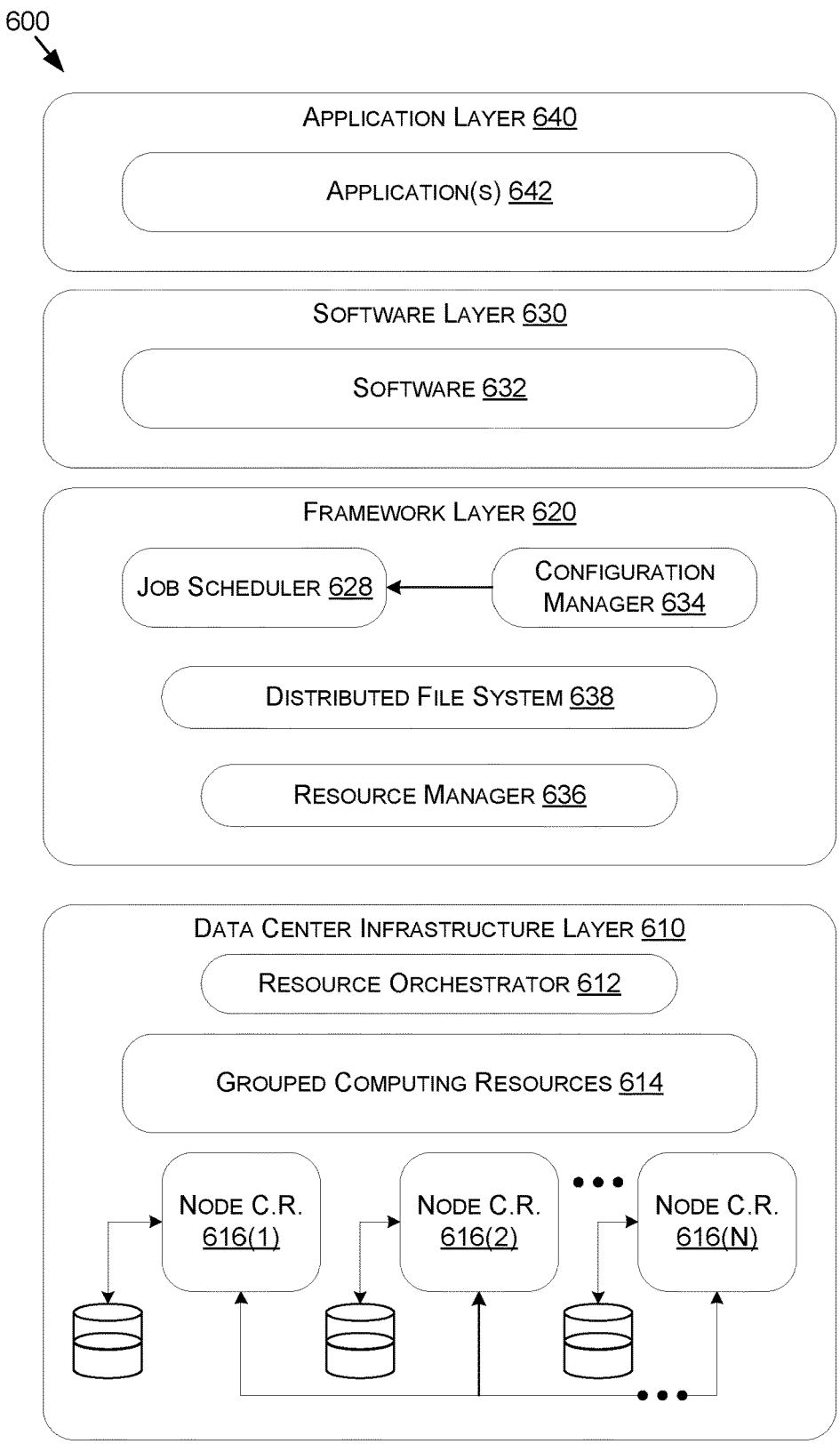
FIG. 6 is a block diagram of an example data center suitable for use in implementing some embodiments of the present disclosure.

FIG. 6 illustrates an example data center 600 that may be used in at least one embodiments of the present disclosure, such as to implement the image processing system 100 in one or more examples of the data center 600. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-6161(N) may include one or more virtual components, such as vGPUs, vCPUs, and/or the like, and/or one or more of the node C.R.s 616(1)-616(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 628, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may use distributed file system 638 for large-scale data processing (e.g., "big data"). In at least one embodiment, job scheduler 628 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 628. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments, such as to implement neural networks of the modifier 112.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underused and/or poor performing portions of a data center.

The data center 600 may include tools, services, software or other resources to train one or more machine learning models (e.g., train machine learning models of modifier 112) or predict or infer information using one or more machine learning models (e.g., machine learning models of modifier 112) according to one or more embodiments described herein. For example, a machine learning model(s) may be trained by calculating weight parameters according to a neural network architecture using software and/or computing resources described above with respect to the data center 600. In at least one embodiment, trained or deployed machine learning models corresponding to one or more neural networks may be used to infer or predict information using resources described above with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
one more circuits to:
identify a subimage from a reference image, the subimage comprising a subset of pixels of the reference image;
provide (i) the subimage and (ii) a driving signal to one or more neural networks to modify the subimage to obtain a modified subimage, the driving signal corresponding to at least one of an audio signal or a video signal;
perform registration of a portion of the modified subimage with a corresponding portion of the reference image to meet at least one criterion for alignment between the portion of the modified subimage and the corresponding portion of the reference image;
determine, based at least on the registration, a transformation for the modified subimage; and
transform, using the transformation, the modified subimage to obtain a transformed subimage.

2. The processor of claim 1, wherein the portion of the modified subimage corresponds to a portion of the subimage that is identified according to at least one of (i) a criterion for detection of a feature in the portion of the subimage or (ii) a criterion for expected movement of one or more pixels representing the feature in the portion of the subimage.

3. The processor of claim 1, wherein the one or more circuits are to perform the registration by determining at least one of a similarity transform, a translation transform, an affine transform, a rigid transform, or a projective transform.

4. The processor of claim 1, wherein the one or more circuits are further to:
identify a feature of interest of the reference image to identify the subimage; and
provide (i) the subimage and (ii) the driving signal to the one or more neural networks to cause the one or more neural networks to modify the subimage to obtain the modified subimage, the modified subimage being at least one of warped, scaled, animated, or shaded relative to the subimage.

5. The processor of claim 4, wherein the one or more circuits are to identify the feature of interest by identifying at least one physical feature of a subject in the reference image.

6. The processor of claim 1, wherein the one or more circuits are to perform the registration using at least one of brightness data or contrast data of the portion.

7. The processor of claim 1, wherein the one or more circuits are to perform the registration according to a gradient profile of the modified subimage.

8. The processor of claim 1, wherein the one or more circuits are to perform the registration using at least one of (i) a dense registration process according to a first subset of features of the portion of the modified subimage or (ii) a sparse registration process according to a second subset of features of the portion of the modified subimage.

9. The processor of claim 1, wherein the one or more circuits are to modify the reference image using the transformed subimage by at least one of (i) blending the reference image with the transformed subimage or (ii) stitching the reference image with the transformed subimage.

10. The processor of claim 1, wherein the processor is comprised in at least one of:
a control system for an autonomous or semi-autonomous machine;
a perception system for an autonomous or semi-autonomous machine;

a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

11. A system comprising:
one or more processing units to execute operations comprising:
identifying a subimage from a reference image, the subimage comprising a subset of pixels of the reference image;
providing (i) the subimage and (ii) driving input to one or more neural networks to modify the subimage to obtain a modified subimage, the driving input corresponding to at least one of audio or video;
performing registration of a portion of the modified subimage, with a corresponding portion of the reference image to meet at least one criterion for alignment between the portion and the corresponding portion, to determine a transformation for the modified subimage according to the registration;
transforming the modified subimage using the transformation, to obtain a transformed subimage; and
modifying the reference image using the transformed subimage.

12. The system of claim 11, wherein the portion of the modified subimage corresponds to a portion of the subimage that is identified according to at least one of (i) a criterion for detection of a feature in the portion of the subimage or (ii) a criterion for expected movement of pixels representing the feature in the portion of the subimage.

13. The system of claim 11, wherein the one or more processing units are to:
identify a physical feature of a subject represented by the reference image to identify the subimage; and
provide (i) the subimage and (ii) the driving input to the one or more neural networks to cause the one or more neural networks to modify the subimage to obtain the modified subimage, the modified subimage being at least one of warped, scaled, animated, or shaded relative to the subimage.

14. The system of claim 11, wherein the one or more processing units are to perform the registration using at least one of brightness data or contrast data of the portion.

15. The system of claim 11, wherein the one or more processing units are to perform the registration according to a gradient profile of the modified subimage.

16. The system of claim 11, wherein the one or more processing units are to perform the registration using at least one of (i) a dense registration process according to a first subset of features of the portion of the modified subimage or (ii) a sparse registration process according to a second subset of features of the portion of the modified subimage.

17. The system of claim 11, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

18. A method comprising:
identifying a subimage from a reference image, the subimage comprising a subset of pixels of the reference image;
providing (i) the subimage and (ii) driving input to one or more neural networks to modify the subimage to obtain a modified subimage, the driving input corresponding to at least one of an audio or video;
performing registration of a portion of the modified subimage, with a corresponding portion of the reference image to meet at least one criterion for alignment between the portion and the corresponding portion, to determine a transformation for the modified subimage according to the registration;
transforming the modified subimage using the transformation, to obtain a transformed subimage; and
modifying the reference image using the transformed subimage.

19. The method of claim 18, further comprising:
selecting, as the subimage, a subset of pixels of the reference image representing a physical feature of a subject depicted in the reference image; and
performing the registration using at least one of brightness data or contrast data of the portion.

20. The method of claim 18, further comprising performing the registration using at least one of (i) a dense registration process according to a first subset of features of the portion of the modified subimage or (ii) a sparse registration process according to a second subset of features of the portion of the modified subimage.

* * * * *